Dec. 27, 1966  C. H. KENYON  3,294,225
COMBINED SHIPPING PACKAGE AND PROTECTIVE ARMOR FOR GLASS PIPE
Filed April 26, 1965  3 Sheets-Sheet 1

INVENTOR.
Charles H. Kenyon
BY
William D. Fosdick
AGENT

Dec. 27, 1966   C. H. KENYON   3,294,225
COMBINED SHIPPING PACKAGE AND PROTECTIVE ARMOR FOR GLASS PIPE
Filed April 26, 1965   3 Sheets-Sheet 3

INVENTOR.
Charles H. Kenyon
BY
William D. Fosdick
AGENT

United States Patent Office 3,294,225
Patented Dec. 27, 1966

3,294,225
COMBINED SHIPPING PACKAGE AND PROTECTIVE ARMOR FOR GLASS PIPE
Charles H. Kenyon, Corning, N.Y., assignor to Corning Glass Works, Corning, N.Y., a corporation of New York
Filed Apr. 26, 1965, Ser. No. 450,975
12 Claims. (Cl. 206—46)

This invention relates to a shipping package for glass pipe, which package is modifiable to permit part of the package to be utilized as protective armor for the pipe during its use.

Due to its ability to withstand the action of corrosive fluids, glass pipe is superior to metallic pipe for many uses. However, a disadvantage of glass pipe is its susceptibility to breakage, both during transportation and during its subsequent use. It is an object of the present invention to provide simple, expeditious and inexpensive means which both protects glass pipe during transportation and permits numerous sections of pipe to be conveniently and reliably stacked together during transportation, and which can be modified to provide reliable protection for the pipe during its subsequent use, particularly where the pipe is to be buried in the ground.

These and other objects which will be apparent from the detailed description of the invention are accomplished, according to one mode thereof, by the provision of glass pipe packaging means comprising two semicylindrical foamed plastic components encasing the glass pipe and having flanged end portions which permit the pipe to be stacked during transportation and which are easily removable from the package while the package encases the pipe, so as to expose the ends of the glass pipe to permit the pipe to be coupled to other components of a pipe system.

The invention will be described with reference to the accompanying drawing, in which.

Figure 8:
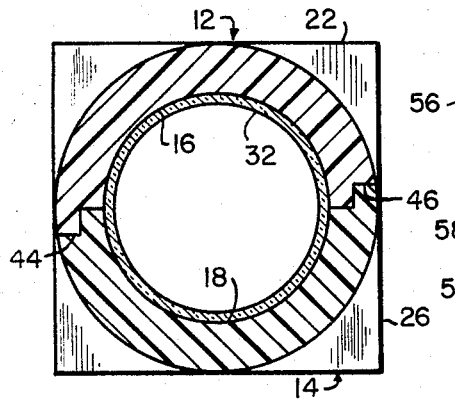
FIGURE 8 is a transverse sectional view through a completed package.
Figure 9:
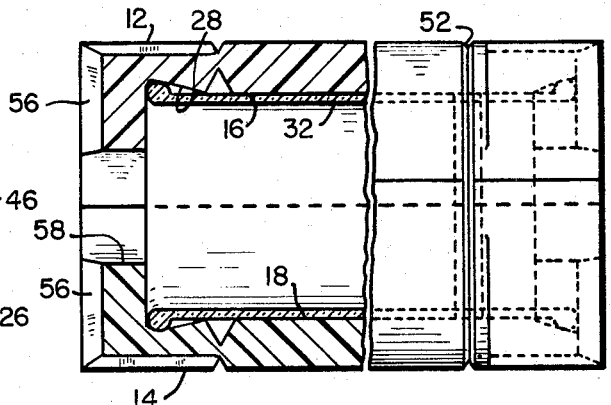
FIGURE 9 is a view of a completed package, partly in axial section.

Referring to the drawings, a complete package 10 comprises two identical package components 12 and 14. Package components 12 and 14 include central body portions having semicylindrical inner surfaces 16 and 18, respectively. Package component 12 includes two flanged end portions 20 and 22, while package component 14 includes two flanged end portions 24 and 26. The inner surfaces of the flanged end portions, such as inner surfaces 28 and 30 of flanged end portions 20 and 22, respectively, have radii larger than the radii of the semicylindrical inner surfaces of the body portions of the respective package components. As illustrated in FIGURES 8 and 9, the semicylindrical inner surfaces have a diameter equal to the outer diameter of encased pipe section 32, while the inner surfaces of the flanged portions provide recesses for the flared ends of the pipe. If the packaged pipe does not have flared ends, the inner surfaces of the end portions and the body portions may be of equal diameter. The package components are held tightly about the glass pipe by appropriate means, such as tapes 35 and 37 of FIGURE 1. Alternatively, a helically wound tape may be utilized to join the components.

Figure 1:
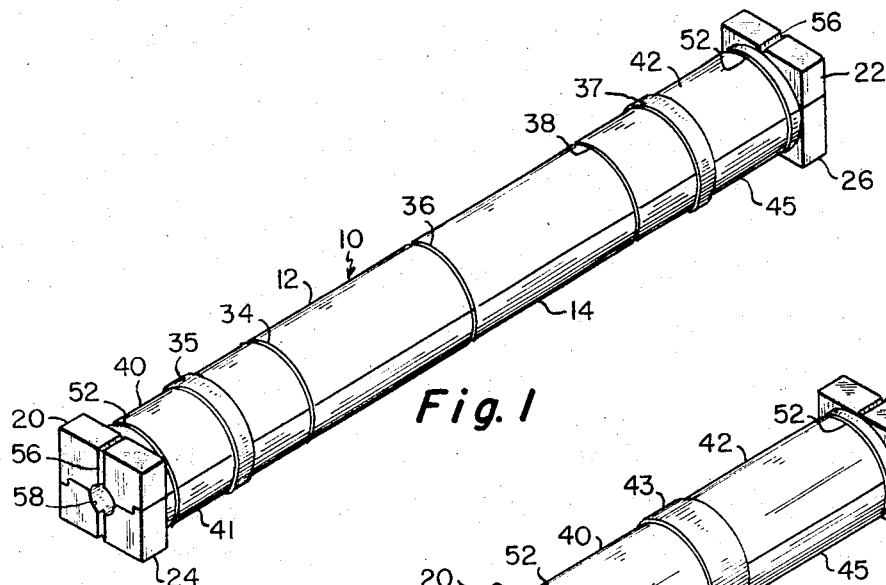
FIGURE 1 is a perspective view of a completed package according to the invention.
Figure 2:
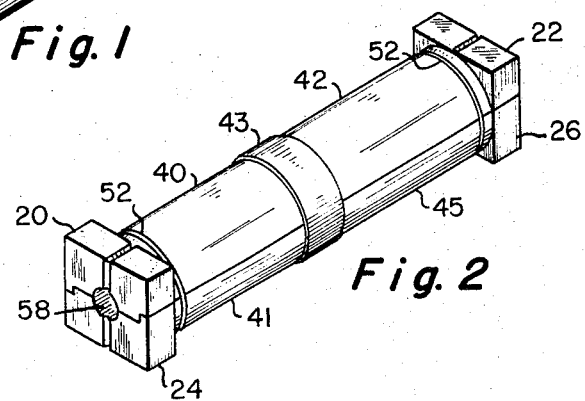
FIGURE 2 is a perspective view of a modified form of the package.

In the embodiment illustrated in FIGURE 1, the package is made up of the two identical components 12 and 14. When it is desired to package pipe sections of shorter lengths, the respective package components may be separated along score lines, such as lines 34, 36 or 38 of FIGURE 1. Thus, the package of FIGURE 2 consists of only the end segments 40, 41, 42 and 45 of the package components, joined by tape 43. The respective package components may initially be formed similar to the segments, i.e., having only one flanged end portion.

Each package component inner surface terminates at two longitudinal mating edges one of which is provided with a tongue, such as tongue 44 of component 12, and another of which is provided with a groove, such as groove 46 of component 12. When the pipe is enclosed between two package components, the tongue of each component is located within the groove of the other component, as illustrated in FIGURE 8.

Figure 3:
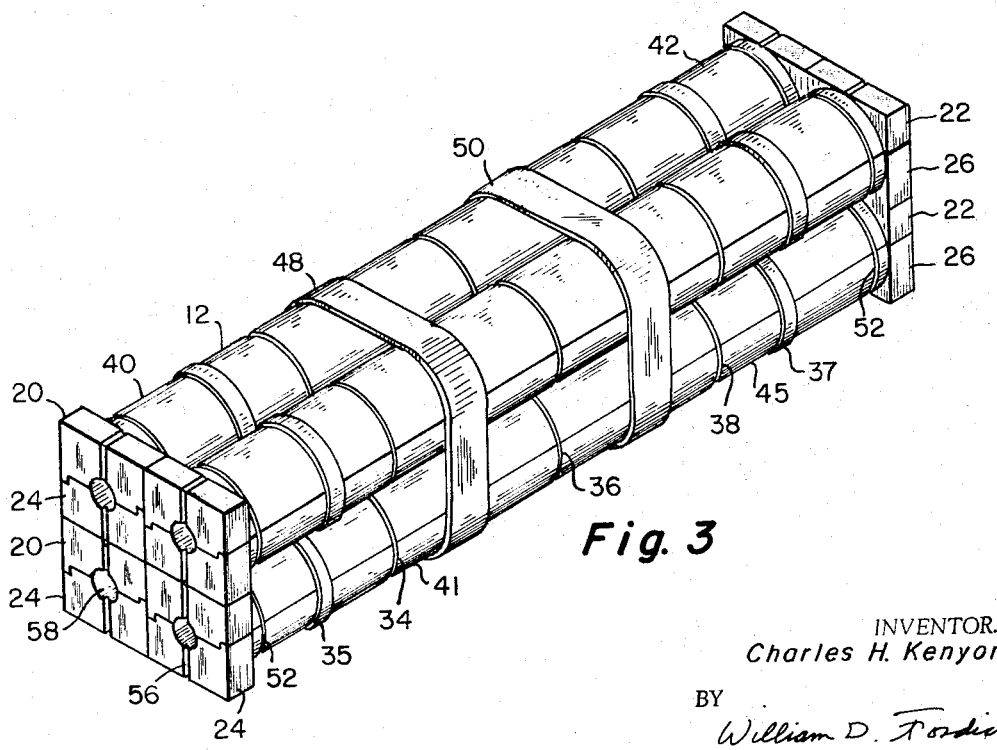
FIGURE 3 is a perspective view illustrating the manner in which packaged sections of pipe may be stacked together to facilitate transportation thereof.

The flanges on the flanged end portions of the package components are generally rectangular in form, preferably with a rectangular length-to-width ratio of 2:1, such that when the components are assembled into a package, the adjacent rectangular flanges form a package end which is square in transverse cross-section, and a plurality of completed packages may be stacked together, as illustrated in FIGURE 3, and held together by means of bands, such as 48 and 50, for convenience during transportation.

Figure 4:
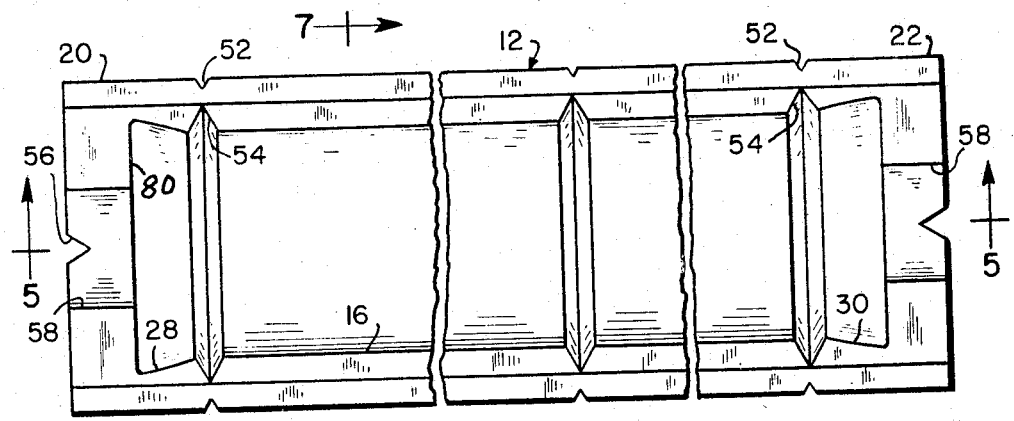
FIGURE 4 is a plan view of one of the package components.
Figure 5:
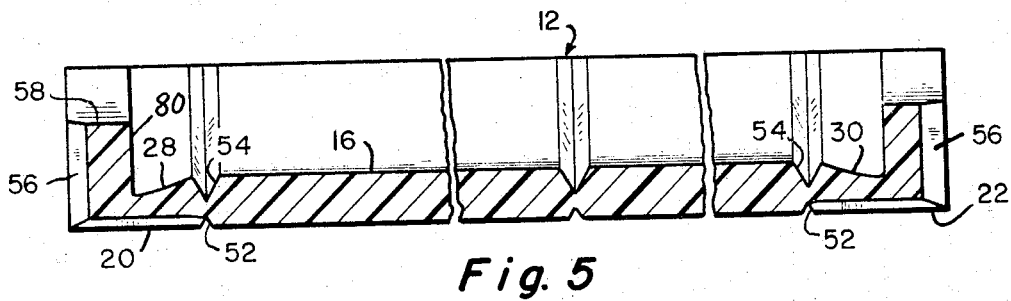
FIGURE 5 is a sectional view taken on line 5—5 of FIGURE 4.
Figure 6:
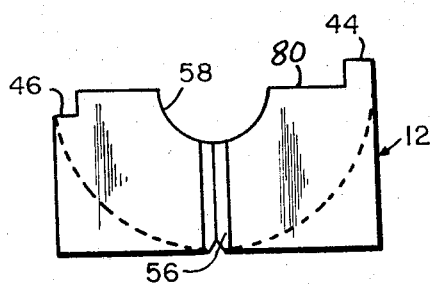
FIGURE 6 is an end view of the package component of FIGURE 5.
Figure 7:
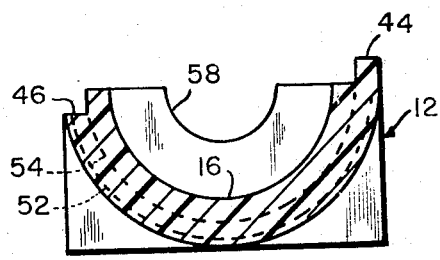
FIGURE 7 is a sectional view taken on line 7—7 of FIGURE 5.
Figure 10:
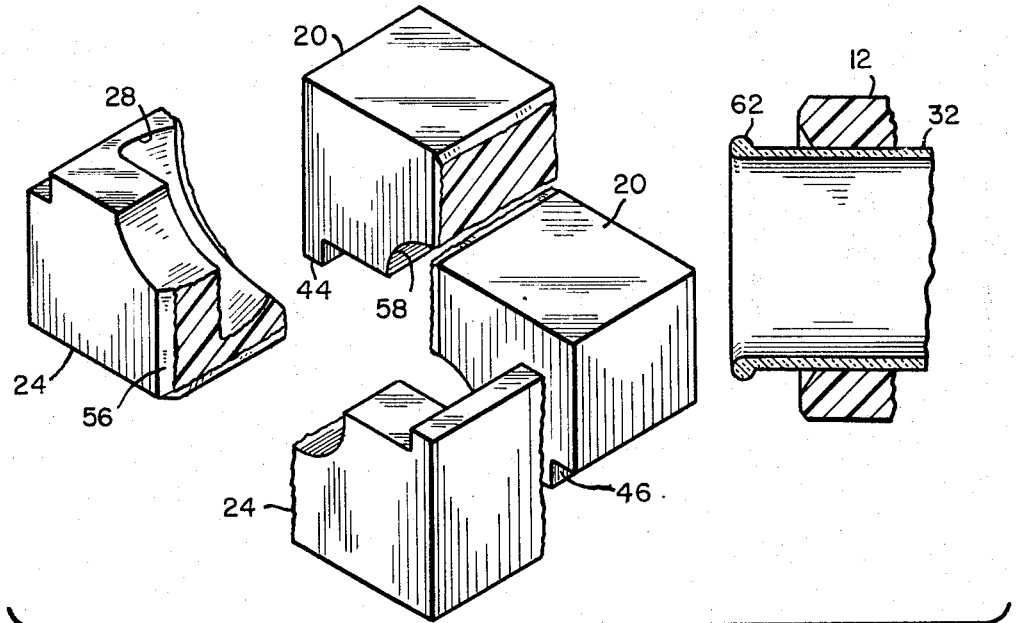
FIGURE 10 is an exploded view showing the end of a package subsequent to the removal of the flanged end portion thereof.

When it is desired to unpackage a section of glass pipe and to install the pipe in a fluid transportation system, the flanged end portions are separated from the package along weakened portions, such as score lines 52 and 54, which separate flanged end portion 20 from the body portion of package component 12. Each flange is provided with a longitudinal score line, such as score line 56, in order to permit the flange to be separated from the package component in two pieces, as illustrated in FIGURE 10. The end wall of each flanged end portion is further provided with a semicylindrical indentation, such as indentation 58 of end wall 80 of FIGURES 4–6, the indentations being positioned such that when the package is assembled, a cylindrical aperture is provided through the package end wall, through which one may insert a finger to facilitate grasping the flange to remove the flange from the package.

Figure 11:
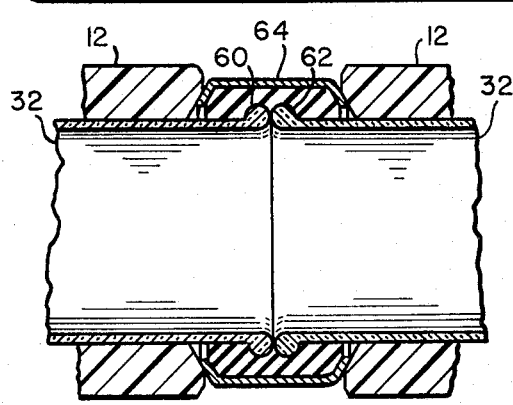
FIGURE 11 is an axial sectional view through two coupled sections of glass pipe encased in the body portions of packages subsequent to the removal of the flanged end portions of the packages.

As illustrated in FIGURES 10 and 11, after the flanged end portions of the package have been removed, the beaded ends 60 and 62 of the pipe sections are exposed, permitting the ends to be joined to other parts of the pipe system, such as by means of coupling 64 of FIGURE 11.

It will be appreciated that variations from the above-described embodiments of the invention may be made within the scope of the invention. Accordingly, it is intended that the scope of the invention be limited only by the scope of the appended claims.

I claim:
1. A package component for use in packaging glass pipe, which component comprises a body portion having a semicylindrical inner surface, at least one end portion, and a weakened portion between said body portion and said end portion adapted to facilitate separation of said end portion from said body portion, said end portion having an external generally rectangular flange.

2. A package component for use in packaging glass pipe, which component comprises a body portion having a semicylindrical inner surface, at least one end portion, and a weakened portion between said body portion and said end portion adapted to facilitate separation of said end portion from said body portion, said end portion having an external generally rectangular flange and an end wall projecting inwardly with respect to said inner surface of said body portion.

3. A package component according to claim 2 in which said semicylindrical inner surface terminates at two parallel longitudinal edges of said component, one said edge being provided with tongue means and the other said edge being provided with groove means.

4. A package component according to claim 2 in which said weakened portion comprises at least one circumferentially extending score line.

5. A package component according to claim 2 in which the inner surface of said end portion adjacent said end wall is of diameter greater than that of the said inner surface of said body portion.

6. A package component according to claim 2 which is formed of a foamed plastic.

7. A package component for use in packaging glass pipe, which component comprises a body portion having an inner surface adapted to encase a section of glass pipe, at least one end portion, and a weakened portion between said body portion and said end portion adapted to facilitate separation of said end portion from said body portion, said end portion having an external generally rectangular flange.

8. A package component for use in packaging glass pipe, said component comprising a body portion having a semicylindrical inner surface adapted to engage the outer surface of a section of glass pipe, and two end portions, each said end portion being integral with said body portion and being separated therefrom by a weakened portion adapted to facilitate separation of said end portion from said body portion, each said end portion having an external generally rectangular flange.

9. The combination of a section of glass pipe with packaging means comprising two substantially identical package components, each said package component comprising two end portions and a body portion having a semicylindrical inner surface, each said end portion being integral with said body portion of the same component, between said body portion and each said end portion of each said component a weakened portion adapted to facilitate separation of said end portion from said body portion, said package components joining one another along longitudinal edges thereof to form a package having a cylindrical inner surface complementary to the outer surface of said section of glass pipe, each said end portion having an external rectangular flange, each said flange of each said package component being adjacent to a flange of the other said package component to form two square end flanges on said package, and means for maintaining said package components about said section of glass pipe.

10. A package according to claim 9 in which each said package component comprises a foamed plastic.

11. The combination with a section of glass pipe of packaging and armoring means, said means comprising a body portion surrounding said pipe and having an inner surface complementary to the outer surface of said pipe an end portion at each extremity of said body portion, each said end portion being provided with a transverse outwardly extending square flange and between said body portion and each said end portion a weakened portion adapted to facilitate the removal of said end portion to expose an end of said pipe.

12. The combination according to claim 11 in which said means is formed of a foamed plastic.

References Cited by the Examiner

UNITED STATES PATENTS

| | | | |
|---|---|---|---|
| 1,301,010 | 4/1919 | Schrade | 220—24 |
| 2,012,535 | 8/1935 | Herrold | 206—63.2 |
| 2,161,402 | 6/1939 | Arutunoff | 206—1 |
| 2,215,705 | 9/1940 | Lenz | 229—51 |
| 2,871,080 | 1/1959 | Shelly | 312—107 |
| 2,919,721 | 1/1960 | Isenberg | 138—96 |
| 3,048,267 | 8/1962 | Starzec | 206—46 |
| 3,146,929 | 9/1964 | Keim | 206—46 |
| 3,164,252 | 1/1965 | Hosbein | 206—65 |
| 3,200,943 | 8/1965 | Waterbury | 206—65 |

THERON E. CONDON, *Primary Examiner.*

W. T. DIXSON, *Assistant Examiner.*